United States Patent

Panek et al.

[11] Patent Number: 5,779,272
[45] Date of Patent: Jul. 14, 1998

[54] ROLL-OVER PROTECTION SYSTEM

[75] Inventors: Bruno J. Panek, Palos Heights; Sudhakar Kolli, Plainfield, both of Ill.

[73] Assignee: Case Corporation, Wis.

[21] Appl. No.: 745,615

[22] Filed: Nov. 7, 1996

[51] Int. Cl.[6] .................................................. B60R 21/13
[52] U.S. Cl. ........................................................ 280/756
[58] Field of Search ................................. 280/756, 651, 280/655, 655.1, DIG. 6, 646; 296/76

[56] References Cited

U.S. PATENT DOCUMENTS

| | | |
|---|---|---|
| 3,188,111 | 6/1965 | Ells et al. |
| 3,289,871 | 12/1966 | Tourneau et al. |
| 3,292,726 | 12/1966 | Jette |
| 3,563,401 | 2/1971 | Gandolfo et al. |
| 3,578,377 | 5/1971 | Babbitt et al. |
| 3,584,897 | 6/1971 | Frantz et al. |
| 3,713,688 | 1/1973 | Monroe |
| 3,733,103 | 5/1973 | Hansen |
| 3,762,761 | 10/1973 | Erickson |
| 3,917,310 | 11/1975 | Mitsuishi |
| 3,934,679 | 1/1976 | Lieptz |
| 4,148,504 | 4/1979 | Rushing |
| 4,158,460 | 6/1979 | White |
| 4,202,565 | 5/1980 | Mosch |
| 4,304,142 | 12/1981 | Blomstrom |
| 4,362,220 | 12/1982 | Baston |
| 4,666,183 | 5/1987 | Azzarello |
| 4,877,265 | 10/1989 | DeBraal et al. |
| 4,949,991 | 8/1990 | Ludwig |
| 4,973,097 | 11/1990 | Hosan et al. ............................. 296/76 |
| 5,042,835 | 8/1991 | Burns |
| 5,129,676 | 7/1992 | Sheehan |
| 5,236,219 | 8/1993 | Jambor et al. |
| 5,404,958 | 4/1995 | Weiss |
| 5,421,604 | 6/1995 | Wu ................................... 280/DIG. 6 |
| 5,503,430 | 4/1996 | Miki et al. |

FOREIGN PATENT DOCUMENTS

| | | |
|---|---|---|
| 726593 | 1/1966 | Canada |
| 907098 | 8/1972 | Canada |
| 1372793 | 8/1964 | France |
| 2541953 | 9/1984 | France |
| 19 19 360 | 8/1970 | Germany |
| 25 43 077 | 3/1977 | Germany |
| 3724273 | 2/1989 | Germany ............................. 280/756 |
| 7710020 | 8/1978 | Netherlands |
| 479425 | 10/1969 | Switzerland |
| 1211640 | 11/1970 | United Kingdom |
| 2163585 | 2/1986 | United Kingdom |

Primary Examiner—Eric D. Culbreth
Attorney, Agent, or Firm—Foley & Lardner

[57] ABSTRACT

A roll-over protection system for a vehicle is provided having a handle and a lift assist assembly. The roll-over protection system includes a support structure and a cross member pivotally coupled to the support structure. The handle is mounted to the cross member, and the lift assist assembly is coupled to the support structure and to the cross member. The handle and the lift assist assembly aid an operator in moving the cross member between folded and upright positions.

21 Claims, 5 Drawing Sheets

ROLL-OVER PROTECTION SYSTEM

FIELD OF THE INVENTION

The present invention relates generally to a roll-over protection system for a vehicle and, more particularly, to a foldable roll-over structure for agricultural tractors and construction equipment.

BACKGROUND OF THE INVENTION

Certain farm tractors and construction equipment have open operator stations including roll-over protection systems, which are designed to support a portion of the vehicle weight in the event of a vehicle roll-over. Typical roll-over protection systems are comprised of an inverted U-shaped bar which is mounted onto the vehicle chassis, such that the bar extends upward and is located over the operator's head.

In certain situations, however, roll-over protection systems may be awkward. For example, it may be difficult for a vehicle with a roll-over protection system to pass through a gateway with a low overhead clearance. To overcome this problem, some roll-over protection systems provide an adjustable, two-part arrangement, whereby an upper cross member is pivotally connected to a lower post portion. Thus, the height of the roll-over protection system can be adjusted by rotating the cross member downward.

One problem with the adjustable roll-over protection systems currently available is that they require the operator to exit the vehicle when raising or lowering the cross member. While some roll-over protection systems employ a lever to assist the operator, they are restricted to lightweight devices. Stronger roll-over protection systems are generally heavier and require the operator to exert more energy when raising the cross member.

In view of the state of current roll-over protection systems, it would be desirable to provide an improved roll-over protection system that assists an operator in raising or lowering a cross member without requiring the operator to leave the operator's seat.

SUMMARY OF THE INVENTION

The present invention provides a roll-over protection device which includes a cross member and a lift assist assembly to aid an operator in manually raising and lowering the cross member. Also provided is a handle on the cross member of the roll-over protection system with which the operator can grasp and manipulate the cross member.

In one embodiment, the roll-over protection system includes a support structure having a pair of vertical posts adapted to be attached to the vehicle. The roll-over protection system further includes a cross member pivotally coupled to the vertical posts and a handle mounted on the cross member. A lift assist assembly coupled to the cross member and to the support structure assists an operator in manually raising and lowering the cross member between a folded and an upright position. The roll-over protection system also includes a latch or locking arrangement for retaining the cross member in a fixed position relative to the support structure.

In accordance with another embodiment, a roll-over protection system is provided for a vehicle. The roll-over protection system comprises a pair of vertical posts adapted to be mounted to the vehicle, a cross member pivotally coupled to the vertical posts and a handle mounted on the cross member. An energy storing member coupled to the cross member and to at least one of the vertical posts assists an operator in manually raising and lowering the cross member between a folded and an upright position.

In accordance with a further embodiment, a vehicle having an exposed operator station is provided. The vehicle includes a support structure, a cross member and a handle mounted to the cross member. The support structure includes a pair of vehicle support members and a pair of vertical posts. The cross member is pivotally coupled to the vertical posts. The vehicle further includes means for assisting an operator in manually raising and lowering the cross member between a raised and a folded position.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
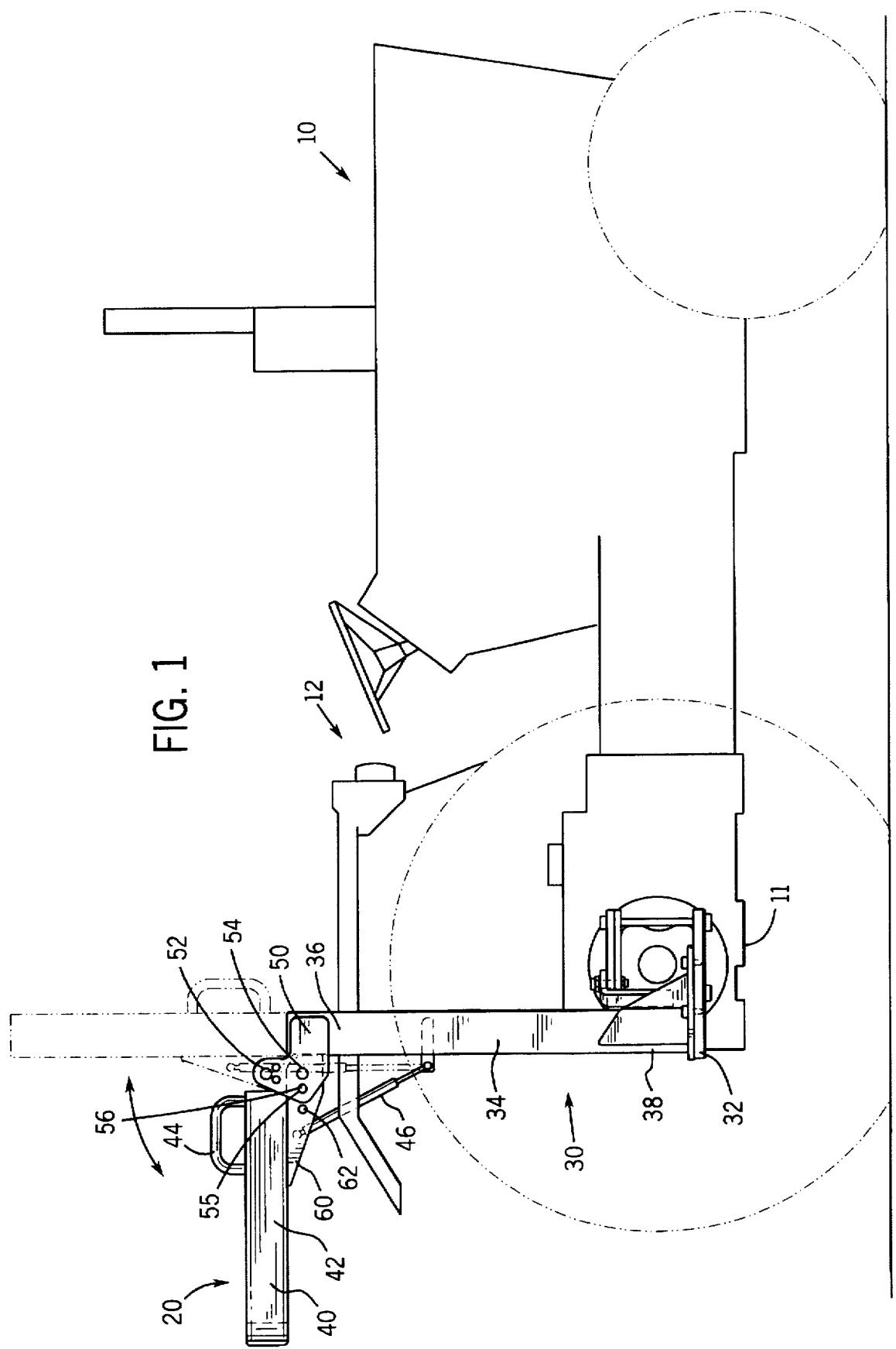
FIG. 1 is a schematic side view of a farm tractor in accordance with the present invention.
Figure 2:
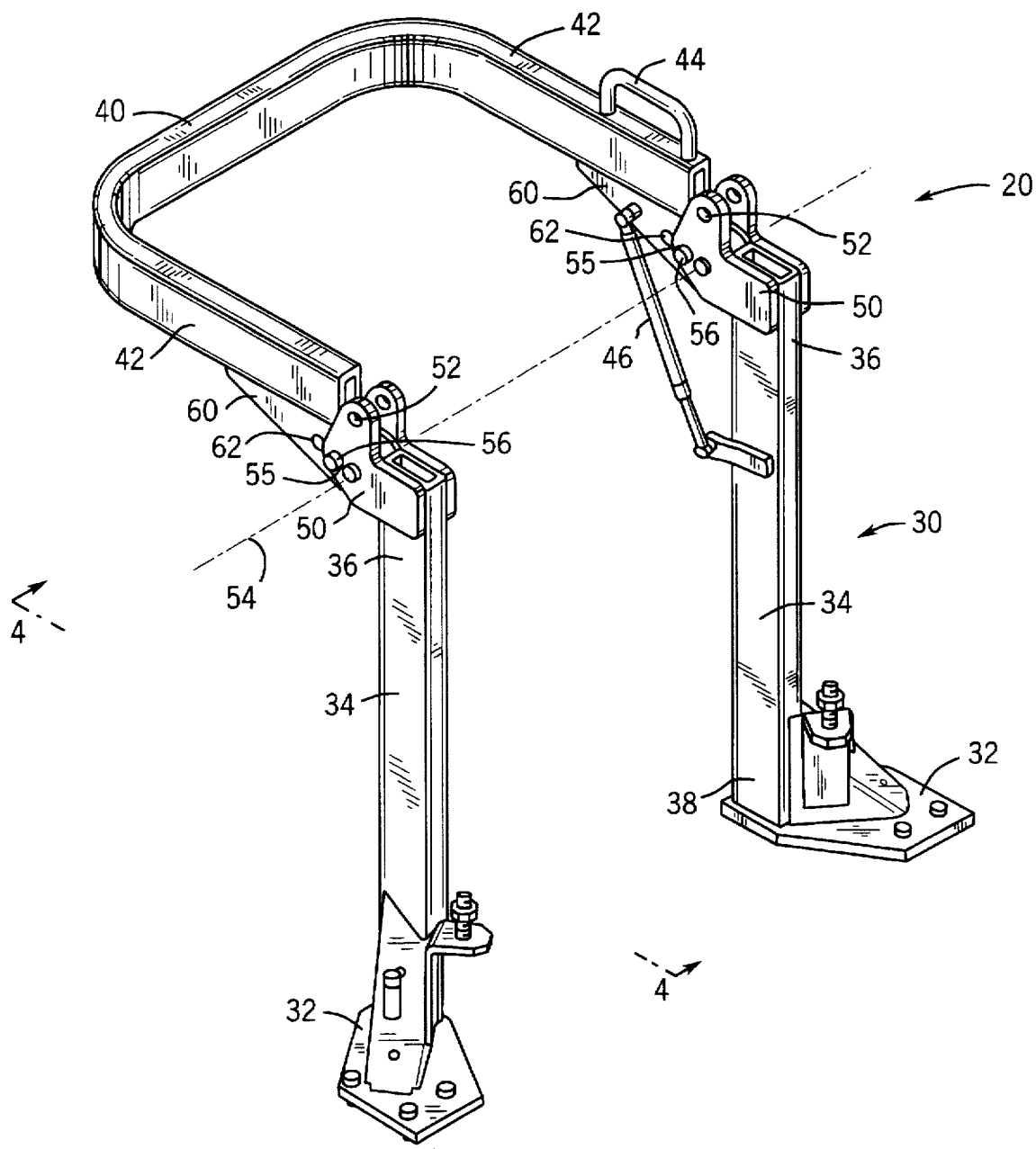
FIG. 2 is a perspective front view of the roll-over protection system showing the cross member in a folded position.
Figure 3:
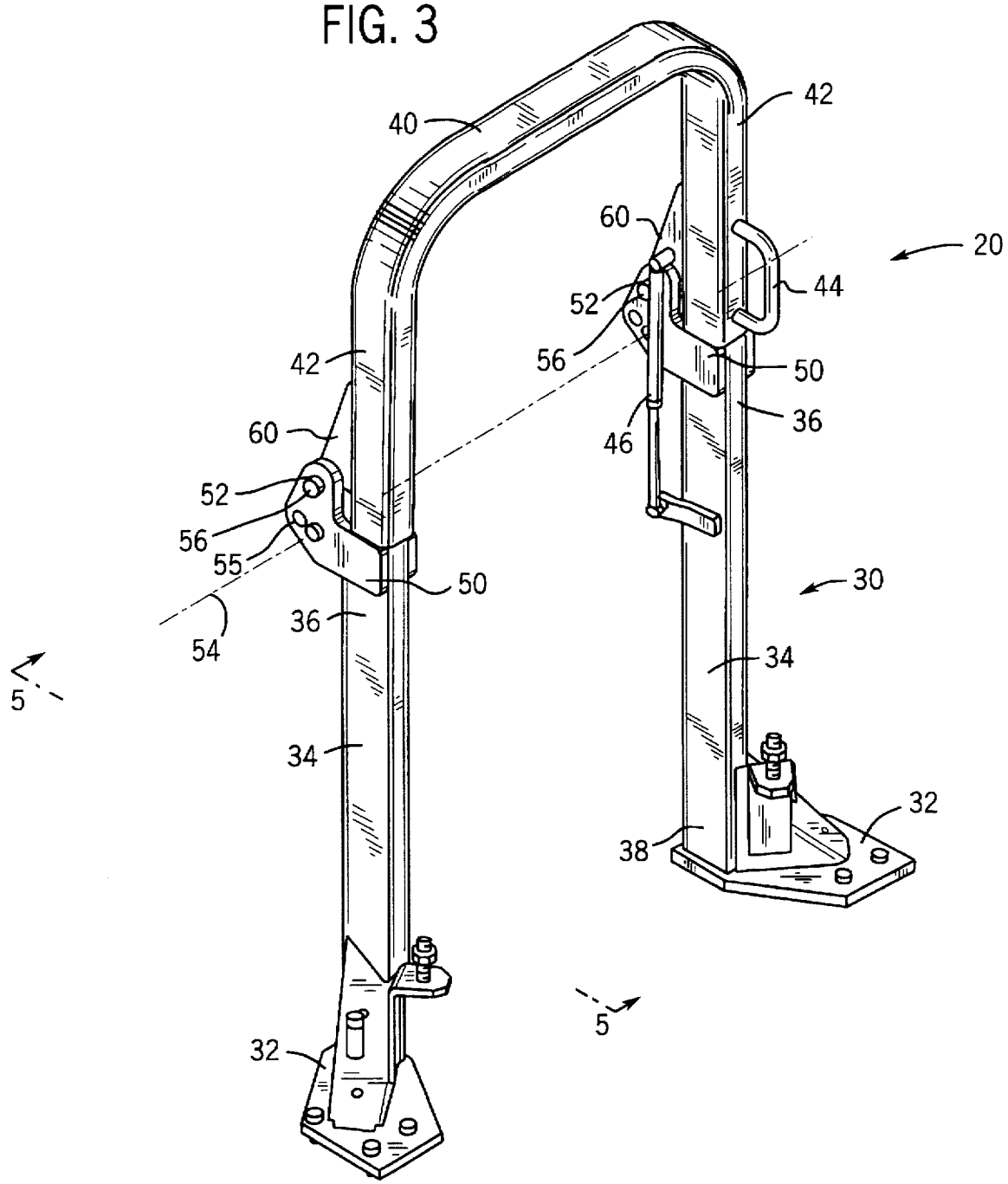
FIG. 3 is a perspective front view of the roll-over protection system showing the cross member in an upright position.

Turning now to the drawings and referring to FIG. 1, a roll-over protection system 20 is illustrated on a vehicle 10. Vehicle 10 may be a tractor or some other type of construction equipment or recreational vehicle including a chassis 11 which may support vehicle support members 32. As illustrated in FIGS. 1–3, roll-over protection system 20 includes a support structure 30 having a pair of vertical posts 34. Vehicle support members 32 may be mounted on the chassis or axle of vehicle 10. Vertical posts 34 have an upper end 36 and a lower end 38. Lower ends 38 of vertical posts 34 are mounted to respective vehicle support members 32. Vehicle support members 32 are mounted on vehicle 10 on opposite sides of an exposed operator station 12. Bolts or other fasteners known in the art may be used to mount vehicle support members 32 to vehicle 10. However, vehicle support members 32 could also be integrally formed (e.g. casted) with, for example, the rear axle of vehicle 10. Roll-over protection system 20 further includes a cross member 40 pivotally coupled to support structure 30.

Figure 5:
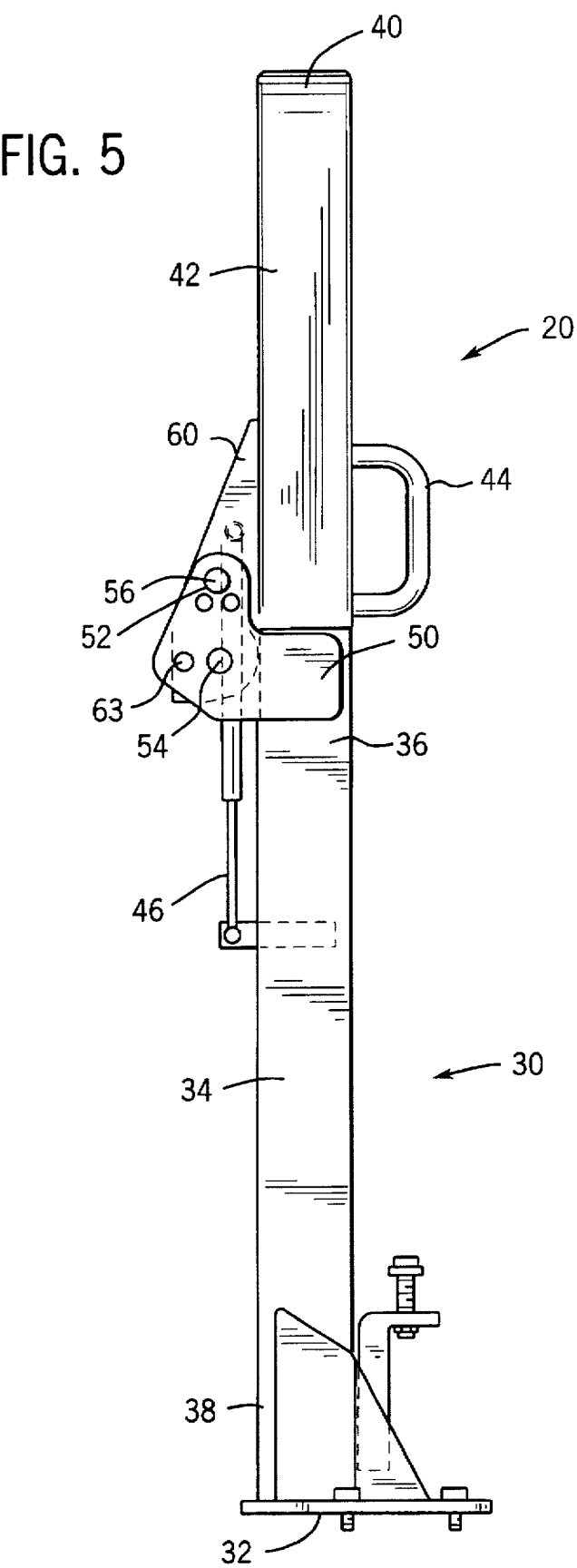
FIG. 5 is a cross-section view of the roll-over protection system taken generally along line 5—5 of FIG. 3.

As shown in FIGS. 2 and 3, cross member 40 is a U-shaped frame having a pair of legs 42. Brackets 60 are mounted (e.g. welded) on legs 42 of cross member 40. Hinges 50 are mounted on upper ends 36 of vertical posts 34. Each bracket 60 is pivotally connected to each respective hinge 50 such that cross member 40 is rotatable about axis 54. Hinges 50 each have two L-shaped side members having holes 52 disposed therein. Holes 52 in the L-shaped members and holes 62 in brackets 60 furthest from axis 54 are adapted to receive locking pins 56 which maintain cross member 40 in an upright position with respect to vertical posts 34 (see FIGS. 3 and 5). Furthermore, a handle 44 is mounted on cross member 40 to provide a grip with which an operator can raise and lower cross member 40.

Roll-over protection system 20 also includes a lift assist assembly 46 coupled to support structure 30 and to cross member 40. Lift assist assembly 46 is connected to a bracket 60 mounted on a leg 42 of cross member 40. Lift assist assembly 46 is an energy storing member such as a compressed gas cylinder. Lift assist assembly 46 may also be a cylinder and cam arrangement including a spring in combination with a dampening device. Energy is stored in lift assist assembly 46 when cross member 40 is moved to its folded position. The stored energy aids an operator in raising cross member 40 to an upright position, thereby reducing the force with which the operator is required to exert when rotating cross member 40 to its upright position.

Figure 4:
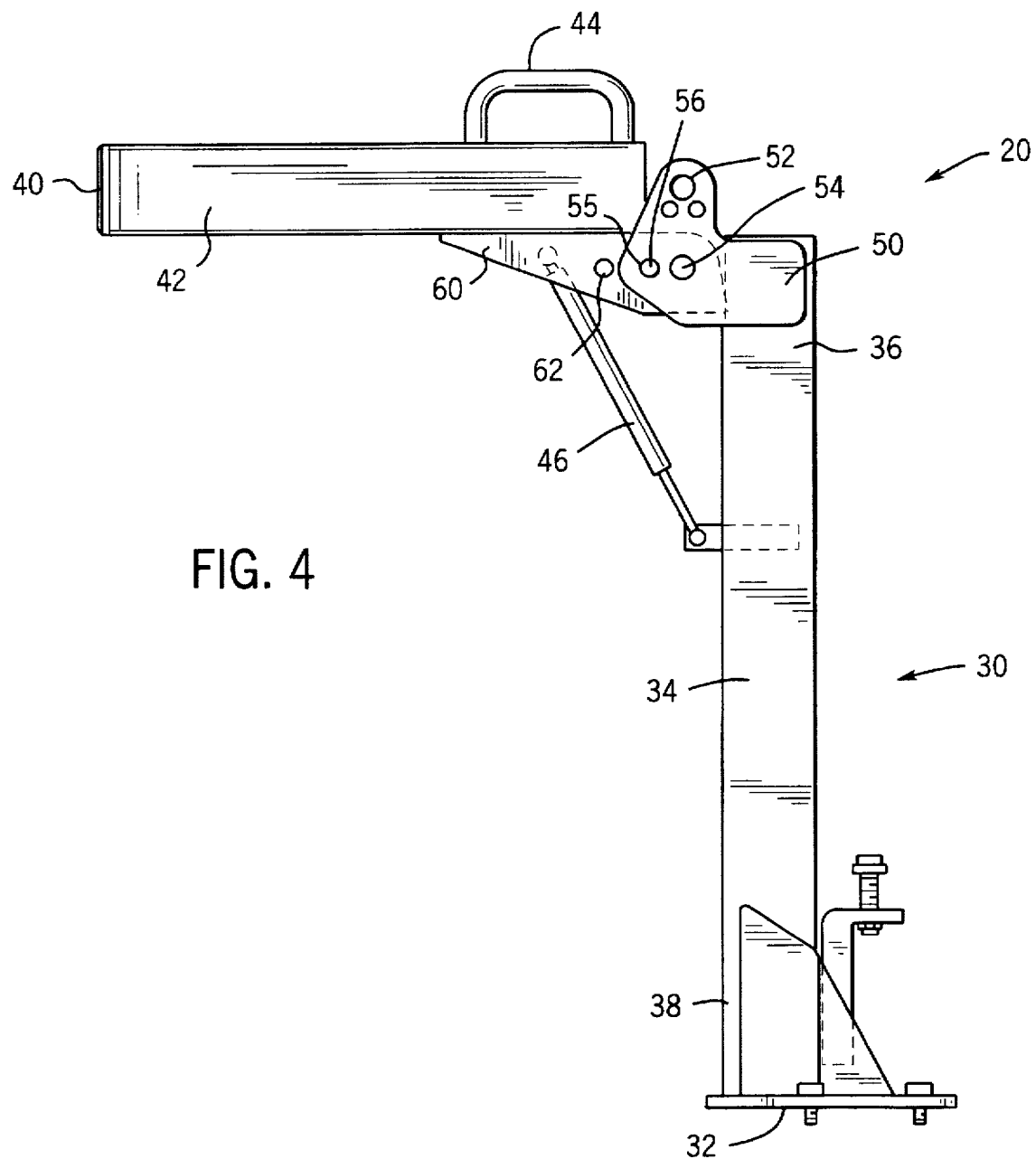
FIG. 4 is a cross-sectional view of the roll-over protection system taken generally along line 4—4 of FIG. 2.

As shown in FIGS. 4 and 2, roll-over protection system 20 includes locking pins 56 also for retaining cross member 40 in a fixed folded position relative to support structure 30. Brackets 60 of cross member 40 have holes 63 (FIG. 5) that align with holes 55 of hinges 50. Each locking pin 56 is engagable with hole 55 of each respective hinge 50 and with hole 63 of each respective bracket 60 to retain cross member 40 in a folded position.

It will be understood that the foregoing description is of a preferred embodiment of this invention and that the invention is not limited to the specific forms shown. For example, the lift assist assembly may be mounted directly on the cross member and on the vertical post. The handle may be replaced by a strap or some other grip device. These and other modifications may be made in the design and arrangement of other elements without departing from the scope of the invention as expressed in the appended claims.

We claim:

1. A roll-over protection system for a construction or agricultural vehicle including a chassis, the roll-over protection system comprising:
    a support structure including a pair of vertical posts, each vertical post having an upper end and a lower end, the lower end of each vertical post being mountable to the chassis;
    a cross member pivotally coupled to the upper ends of the vertical posts between a folded position and an upright position;
    a substantially stationary handle attached to the cross member; and
    a lift assist assembly coupled to the cross member and to the support structure, the lift assist assembly applying a force between the cross member and the support structure to urge the cross member toward the upright position.

2. The roll-over protection system as recited in claim 1, wherein the lift assist assembly is coupled to at least one of the vertical posts of the support structure.

3. The roll-over protection system as recited in claim 1, wherein the cross member is a U-shaped frame having a pair of legs.

4. The roll-over protection system as recited in claim 3, further including a first cross member position retainer comprising:
    a first hinge mounted on the upper end of one of the vertical posts and having a plurality of first holes disposed therein;
    a first bracket mounted to a respective leg of the cross member and pivotally connected to the first hinge, the first bracket having a plurality of second holes disposed therein, one of the plurality of second holes being aligned with one of the plurality of first holes of the first hinge when the cross member is in the folded and upright positions; and
    a first locking pin engagable with the plurality of first and second holes of the first hinge and the first bracket, respectively, to retain the cross member in fixed positions relative to the pair of vertical posts.

5. The roll-over protection system as recited in claim 4, further including a second cross member position retainer comprising:
    a second hinge mounted on the upper end of one of the vertical posts and having a plurality of first holes disposed therein;
    a second bracket mounted to a respective leg of the cross member and pivotally connected to the second hinge, the second bracket having a plurality of second holes disposed therein, one of the plurality of second holes being aligned with one of the plurality of first holes of the second hinge when the cross member is in the folded and upright positions; and
    a second locking pin engagable with the plurality of first and second holes of the second hinge and the second bracket, respectively, to retain the cross member in fixed positions relative to the pair of vertical posts.

6. The roll-over protection system as recited in claim 1, wherein the lift assist assembly includes a spring.

7. The roll-over protection system as recited in claim 6, wherein the lift assist assembly further includes a dampening device.

8. The roll-over protection system as recited in claim 1, wherein the lift assist assembly includes a compressed gas cylinder.

9. A roll-over protection system for an off-road vehicle, the roll-over protection system comprising:
    a pair of vertical posts, each vertical post having an upper end and a lower end, the lower end adapted to be coupled to the vehicle;
    a cross member pivotally coupled to the upper end of the vertical posts between a folded position and an upright position;
    a substantially stationary handle mounted on the cross member; and
    an energy storing member coupled to the cross member and to at least one of the vertical posts, the energy storing member applying a force between the cross member and the support structure to urge the cross member toward the upright position.

10. The roll-over protection system as recited in claim 9, wherein the cross member is a U-shaped frame having a pair of legs.

11. The roll-over protection system as recited in claim 10, further including a cross member position retainer comprising:
    a pair of hinges, each hinge being mounted on the upper end of a respective vertical post and having a plurality of first holes disposed therein;
    a pair of brackets, each bracket being mounted to a respective leg of the cross member and pivotally connected to a respective hinge, each bracket having a plurality of second holes disposed therein, one of the plurality of second holes being aligned with one of the plurality of first holes of a respective hinge when the cross member is in the folded and upright positions; and
    a pair of locking pins, each locking pin being engagable with the plurality of first and second holes of a respective hinge and a respective bracket to retain the cross member in a fixed position relative to the pair of vertical posts.

12. The roll-over protection system as recited in claim 9, wherein the energy storing member includes a spring.

13. The roll-over protection system as recited in claim 12, wherein the energy storing member further includes a dampening device.

14. The roll-over protection system as recited in claim 9, wherein the energy storing member includes a compressed gas cylinder.

15. A construction or agricultural vehicle having an exposed operator station, the vehicle comprising:

- a support structure including a pair of vehicle support members and a pair of vertical posts, each vertical post having an upper end and a lower end, the lower end of each vertical post being mounted on each respective vehicle support member, the pair of vehicle support members adapted to be mounted on opposite sides of the vehicle;
- a cross member pivotally coupled to the upper ends of the vertical posts between a folded position and an upright position;
- a substantially stationary handle mounted on the cross member; and
- means for assisting an operator in manually raising and lowering the cross member between a folded and an upright position, the assist means coupled to the cross member and to the support structure.

16. The vehicle as recited in claim 15, further comprising a cross member position retainer coupled to at least one of the vertical posts.

17. The vehicle as recited in claim 15, wherein the cross-member is a U-shaped frame having a pair of legs.

18. The vehicle as recited in claim 17, wherein the cross member position retainer comprises:

- a hinge mounted on the upper end of a respective vertical post and having a plurality of first holes disposed therein;
- a bracket mounted to a respective leg of the cross member and pivotally connected to a respective hinge, the bracket having a plurality of second holes disposed therein, one of the plurality of second holes being aligned with one of the plurality of first holes of a respective hinge when the cross member is in the folded and upright positions; and
- a locking pin engagable with the plurality of first and second holes of a respective hinge and a respective bracket to retain the cross member in fixed positions relative to the pair of vertical posts.

19. The vehicle as recited in claim 15, wherein the assist means includes a spring.

20. The vehicle as recited in claim 19, wherein the assist means further includes a dampening device.

21. The vehicle as recited in claim 15, wherein the assist means includes a compressed gas cylinder.

* * * * *

UNITED STATES PATENT AND TRADEMARK OFFICE
CERTIFICATE OF CORRECTION

PATENT NO. : 5,779,272
DATED : July 14, 1998
INVENTOR(S) : Panek et al.

It is certified that error appears in the above-identified patent and that said Letters Patent is hereby corrected as shown below:

On the title page, item [54] add as inventor, --Jacob Thomas--

Signed and Sealed this

Thirtieth Day of March, 1999

Attest:

Q. TODD DICKINSON

Attesting Officer

Acting Commissioner of Patents and Trademarks